United States Patent
Park

(10) Patent No.: US 9,092,891 B2
(45) Date of Patent: Jul. 28, 2015

(54) METHOD AND APPARATUS OF ENVIRONMENT VISUALIZATION FOR TELE-OPERATION THROUGH HIERARCHIZATION OF OBJECT CHARACTERISTICS

(71) Applicant: Electronics and Telecommunications Research Institute, Daejeon (KR)

(72) Inventor: SeungHwan Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 193 days.

(21) Appl. No.: 13/966,204

(22) Filed: Aug. 13, 2013

(65) Prior Publication Data
US 2014/0205142 A1  Jul. 24, 2014

(51) Int. Cl.
*G06K 9/00* (2006.01)
*G06T 11/00* (2006.01)

(52) U.S. Cl.
CPC ............ *G06T 11/00* (2013.01); *G06K 9/00671* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,410,346 | A * | 4/1995 | Saneyoshi et al. | 348/116 |
| 6,226,571 | B1 * | 5/2001 | Kai | 701/1 |
| 7,262,710 | B2 * | 8/2007 | Watanabe et al. | 340/903 |
| 7,359,782 | B2 * | 4/2008 | Breed | 701/45 |
| 8,812,226 | B2 * | 8/2014 | Zeng | 701/301 |
| 2005/0240335 | A1 * | 10/2005 | Schroder | 701/96 |
| 2008/0046150 | A1 * | 2/2008 | Breed | 701/45 |
| 2010/0057321 | A1 * | 3/2010 | Randler et al. | 701/96 |
| 2014/0111647 | A1 * | 4/2014 | Atsmon et al. | 348/148 |

FOREIGN PATENT DOCUMENTS

JP  08-294849 A  11/1996

OTHER PUBLICATIONS

Seunghwan Park et al., "Object-Space Classification and linkage for Environment Visualization", 2012 9th International Conference on Ubiquitous Robots and Ambient Intelligence (URAI), Nov. 26, 2012, Poster Session 1, TP-32.
Seunghwan Park et al., "Space Visualization Method for Effective Control of Tele-Operation Robot", Conference on the Institute of Electronics Engineers of Korea 2013, Jul. 4, 2013, pp. 1162-1164, vol. 36, No. 1.

* cited by examiner

*Primary Examiner* — Anand Bhatnagar

(57) ABSTRACT

A method of environment visualization for a tele-operation, includes an augmented reality technology in which an image with various types of information is provided to a user to achieve fun and usefulness, and an apparatus and a method of environment visualization for a tele-operation, in which external factors are added to image information to be provided to an operator by using hierarchization of object characteristics so as to improve the attention of the operator, thereby maximally preventing mistakes of the operator.

12 Claims, 3 Drawing Sheets

METHOD AND APPARATUS OF ENVIRONMENT VISUALIZATION FOR TELE-OPERATION THROUGH HIERARCHIZATION OF OBJECT CHARACTERISTICS

RELATED APPLICATIONS

This application claims the benefit of Korean Patent Application No. 10-2013-0006899, filed on Jan. 22, 2013, which is hereby incorporated by reference as if fully set forth herein.

FIELD OF THE INVENTION

The present invention relates to a method and an apparatus of environment visualization for tele-operation through hierarchization of object characteristics, and more particularly to a method and an apparatus of environment visualization for tele-operation, which adds additional information to an environment including a platform to be subject to tele-operation and visualizes the environment.

BACKGROUND OF THE INVENTION

As is well known, when operating a robot, a pilotless plane, a car and the like from a remote place, an operator coarsely estimates the position of a platform to be operated based on image information that is transmitted from a camera, and operates the platform.

In such a case, since the operator does not exactly recognize a relative position or direction between the platform and a surrounding environment, the platform may frequently collide with a peripheral object or may not move in a desired direction.

In order to prevent such a problem, some systems add a virtual occupation area (an area actually occupied by the platform after a predetermined time) of the platform to the image information or display the virtual occupation area on a monitor, thereby facilitating the operation of a tele-operator. A representative example is to display a virtual occupation area including several reference lines on a rear monitor when a car runs backward.

SUMMARY OF THE INVENTION

However, such a scheme is not helpful to a person unfamiliar to the operation of the platform, and does not contribute to solving a problem such as a collision when a person having many operation experiences of the platform meets with urgent situations.

Another problem that may occur in a tele-operation is that a collision may occur by an unskilled operation due to insufficient attention of an operator. Differently from a machine, even though a person continuously accepts visual information, when similar types of information is continuously received, the person has a system that loses and accepts some types of information. Furthermore, when information determined to be more important personally is accepted or comes across one's mind, a person may instantaneously ignore visual information.

In view of the above, the present invention provides an augmented reality technology in which an image with various types of information is provided to a user to achieve fun and usefulness, and an apparatus and a method of environment visualization for a tele-operation, in which external factors are added to image information to be provided to an operator by using hierarchization of object characteristics so as to improve the attention of the operator, thereby maximally preventing mistakes of the operator.

In accordance with the present invention, characteristics for an individual object can be hierarchized based on information on a surrounding environment of a platform to be subject to a tele-operation, and additional information can be added to the object according to a result of the hierarchization, so that a tele-operator is able to easily recognize the object.

Thus, the tele-operator is able to easily and exactly recognize a current situation around the platform to be subject to the tele-operation and to exactly operate the platform. Consequently, it is possible to prevent a dangerous situation such as a collision which may occur by an unskilled operation or insufficient attention of the tele-operator.

In accordance with a first aspect of the exemplary embodiment of the present invention, there is provided a method of environment visualization for a tele-operation, includes: acquiring information on a surrounding environment of a platform to be subject to a tele-operation; analyzing and recognizing geometrical characteristics for objects existing in a vicinity of the platform through the acquired information; recognizing visualization rules for a plurality of specific situations according to relative positional relations between the platform and the objects and visualization effect information to be reproduced in the specific situations according to the visualization rules; performing hierarchization for the objects by using the geometric characteristics, the visualization rules, and the visualization effect information; and reproducing a visualization effect based on the visualization effect information corresponding to the specific situations according to a result of the performed hierarchization.

In the exemplary embodiment, the method further includes in the acquiring of the information, at least one of information on a shape of the object, information on a position of the object, and information on a relative distance between the platform and the object is acquired.

In the exemplary embodiment, the method further includes in the analyzing and recognizing of the geometrical characteristics, information on volume of the object is acquired based on the geometrical characteristics including a length, a breadth, and a height of the object.

In the exemplary embodiment, the method further includes the visualization rules include visualization rules in at least one of an expected collision situation with the object, an expected going-over situation, and an expected approximate situation, which occur by movement of the platform.

In the exemplary embodiment, the method further includes the visualization effect information corresponds to the plurality of specific situations in a one-to-one manner.

In the exemplary embodiment, the method further includes the visualization effect information includes at least one of a color change effect, a flickering effect, and a lustrous effect.

In accordance with a second aspect of the exemplary embodiment of the present invention, there is provided an apparatus of environment visualization for a tele-operation, includes: an information acquisition unit for acquiring information on a surrounding environment of a platform to be subject to a tele-operation; a characteristic recognition unit for analyzing and recognizing geometrical characteristics for objects existing in a vicinity of the platform through the information acquired by the information acquisition unit; a visualization rule storage unit for storing visualization rules for a plurality of specific situations according to relative positional relations between the platform and the objects; a visualization effect storage unit for storing visualization effect information to be reproduced in the specific situations according to the visualization rules; a hierarchization unit for performing hierarchization for the objects by using the geometric characteristics, the visualization rules, and the visualization effect information; and a visualization unit for reproducing a visualization effect based on the visualization effect information corresponding to the specific situations according to a result of the hierarchization performed by the hierarchization unit.

In the exemplary embodiment, the apparatus further includes the information acquisition unit acquires at least one of information on a shape of the object, information on a position of the object, and information on a relative distance between the platform and the object.

In the exemplary embodiment, the apparatus further includes the characteristic recognition unit acquires information on volume of the object based on the geometrical characteristics including a length, a breadth, and a height of the object.

In the exemplary embodiment, the apparatus further includes the visualization rule storage unit stores visualization rules in at least one of an expected collision situation with the object, an expected going-over situation, and an expected approximate situation, which occur by movement of the platform.

In the exemplary embodiment, the apparatus further includes the visualization effect storage unit stores the visualization effect information corresponding to the plurality of specific situations in a one-to-one manner.

In the exemplary embodiment, the apparatus further includes the visualization effect information includes at least one of a color change effect, a flickering effect, and a lustrous effect.

BRIEF DESCRIPTION OF THE DRAWINGS

The objects and qualities of the present invention will become apparent from the following description of embodiments given in conjunction with the accompanying drawings, in which.

DETAILED DESCRIPTION OF THE EMBODIMENTS

Figure 1:
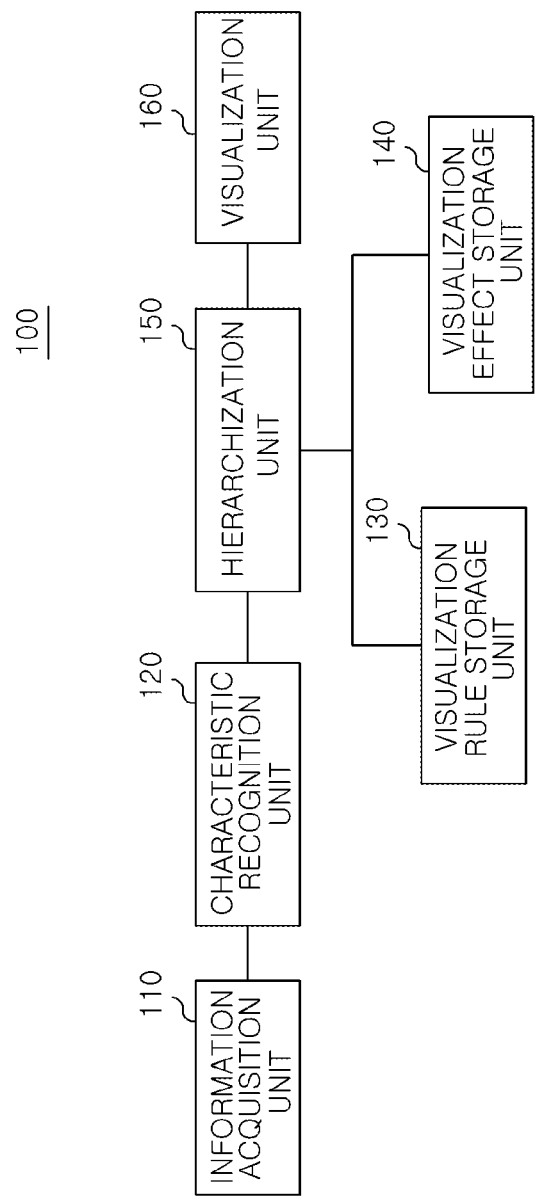
FIG. 1 is a block diagram illustrating the configuration of an apparatus of environment visualization for a tele-operation according to an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings.

FIG. 1 is a block diagram illustrating the configuration of an apparatus of environment visualization for a tele-operation according to an embodiment of the present invention.

As illustrated in FIG. 1, an apparatus 100 of environment visualization includes an information acquisition unit 110, a characteristic recognition unit 120, a visualization rule storage unit 130, a visualization effect storage unit 140, a hierarchization unit 150, and a visualization unit 160.

The information acquisition unit 110 acquires information on a surrounding environment of a platform to be subject to a tele-operation. Such an information acquisition unit 110 acquires information on the shape of an object, information on the position of the object, information on a relative distance between the platform and the object, and the like. For example, the information acquisition unit 110 may include a camera device, which acquires image information by using a light receiving element such as CCD (Charge Coupled Device) or CMOS (Complementary Metal Oxide Semiconductor), or a distance measurement device capable of measuring a distance to an object by using ultrasonic waves and the like. Furthermore, the information acquisition unit 110 may be mounted in the platform or may be installed in a peripheral space of the platform. In addition, a plurality of devices may constitute the information acquisition unit 110.

The characteristic recognition unit 120 analyzes and recognizes geometrical characteristics for objects existing in the vicinity of the platform through the information acquired by the information acquisition unit 110. Such a characteristic recognition unit 120 acquires information on the surface, volume and the like of the objects based on the geometrical characteristics including lengths, breadths, and heights of the objects. As described above, the information on the volume of the object is acquired, so that the objects can be expressed in a three-dimensional environment and thus high quality information can be transferred to a tele-operator.

The visualization rule storage unit 130 stores visualization rules for specific situations according to relative positional relations between the platform and the objects. Such a visualization rule storage unit 130 stores visualization rules in an expected collision situation with the objects, an expected going-over situation, an expected approximate situation and the like, which may occur by the movement of the platform. The expected going-over situation indicates the case in which a collision with the object occurs but the platform is not broken through going-over and the like. The expected approximate situation indicates the case in which the objects exist in an approximate position separated from a movement area of the platform.

The visualization effect storage unit 140 stores visualization effect information to be reproduced in the specific situations according to the visualization rules. Such a visualization effect storage unit 140 may store visualization effect information corresponding to a plurality of specific situations in a one-to-one manner. The visualization effect information includes a color change effect, a flickering effect, a lustrous effect and the like.

The hierarchization unit 150 performs hierarchization for the objects by using the geometric characteristics, the visualization rules, and the visualization effect information of the objects. Such a hierarchization unit 150 classifies the information on the objects into three layers including the geometric characteristics, the visualization rules, and the visualization effect information, and stores the three layers. One object may have one type of characteristic information or various types of characteristic information per one layer.

The visualization unit 160 reproduces a visualization effect based on the visualization effect information corresponding to the specific situations according to a result obtained by performing the hierarchization by the hierarchization unit 150.

Figure 2:
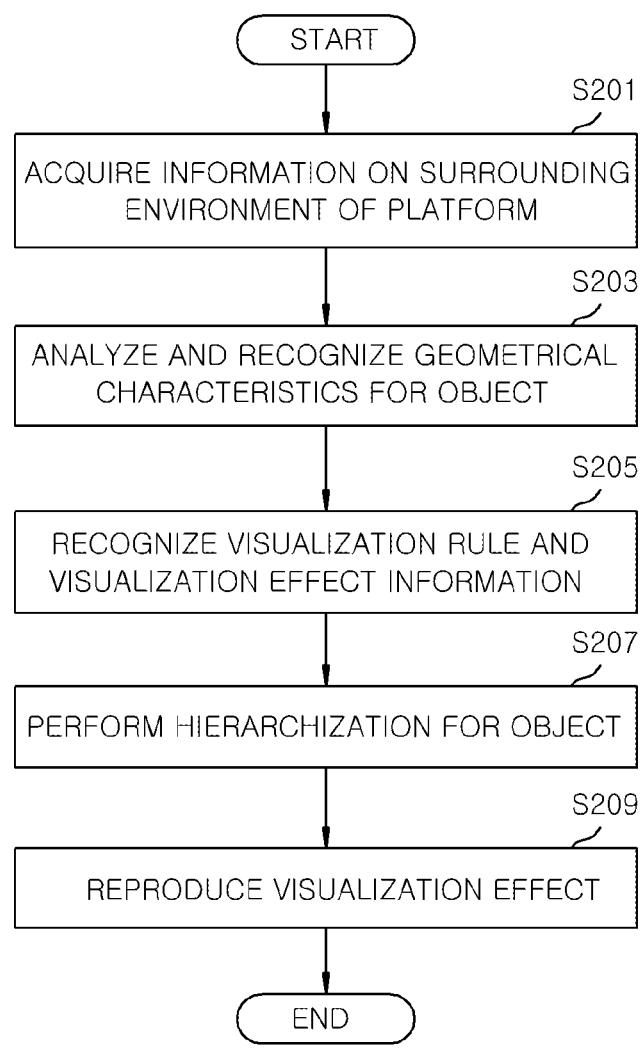
FIG. 2 is a flowchart for explaining a method of environment visualization for a tele-operation according to an embodiment of the present invention.

FIG. 2 is a flowchart for explaining a method of environment visualization for a tele-operation according to the embodiment of the present invention.

As illustrated in FIG. 2, the method of environment visualization for a tele-operation includes a step (S201) of acquiring information on a surrounding environment of a platform to be subject to a tele-operation, a step (S203) of analyzing and recognizing geometrical characteristics for objects existing in the vicinity of the platform through the acquired information, a step (S205) of recognizing visualization rules for specific situations according to a relative positional relation between the platform and the objects and visualization effect information to be reproduced in the specific situations according to the visualization rules, and a step (S207) of performing hierarchization for the objects by using the geometric characteristics, the visualization rules, and the visualization effect information, and a step (S209) of reproducing a visualization effect based on the visualization effect information corresponding to the specific situations according to a result of the performed hierarchization.

Figure 3:
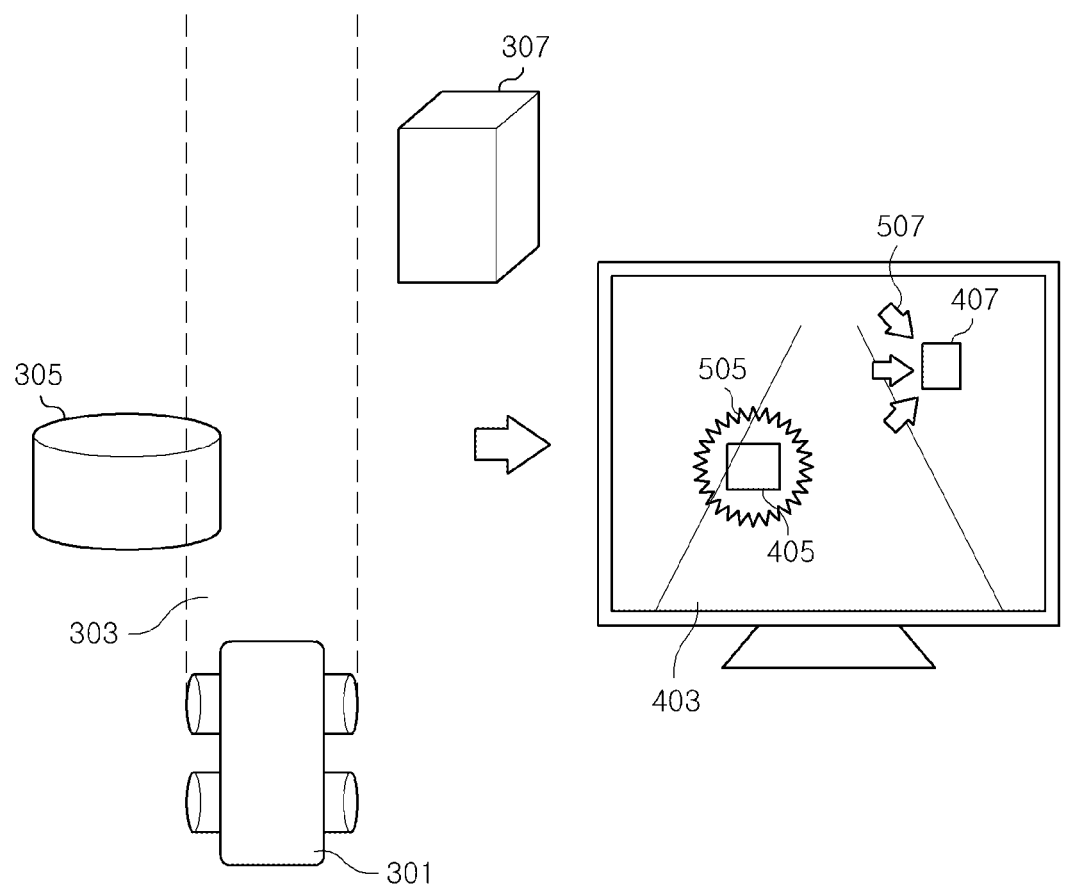
FIG. 3 is a diagram illustrating an example of a surrounding environment of a platform to be subject to a tele-operation and environment visualization based on the surrounding environment.

Hereinafter, a process, in which the apparatus of environment visualization for a tele-operation according to the embodiment of the present invention visualizes the surrounding environment of the platform to be subject to the tele-operation, will be described in more detail with reference to FIG. 1 to FIG. 3.

The visualization rule storage unit 130 stores the visualization rules for the specific situations according to the relative positional relation between the platform to be subject to the tele-operation and the objects. Furthermore, the visualization rule storage unit 130 may store the visualization rules in the expected collision situation with the objects, the expected going-over situation, the expected approximate situation and the like, which may occur by the movement of the platform. The expected going-over situation indicates the case in which a collision with the objects occurs but the platform is not broken through going-over and the like. The expected approximate situation indicates the case in which the objects exist in an approximate position separated from a movement area of the platform.

In addition, the visualization effect storage unit 140 stores the visualization effect information to be reproduced in the specific situations according to the visualization rules. Furthermore, the visualization effect storage unit 140 may store the visualization effect information corresponding to a plurality of specific situations, which include the expected collision situation, the expected going-over situation, the expected approximate situation and the like, in a one-to-one manner. The visualization effect information includes a color change effect, a flickering effect, a lustrous effect and the like.

In the state in which the visualization rules and the visualization effect are stored as described above, the information acquisition unit 110 acquires information on the surrounding environment of the platform to be subject to the tele-operation, and provides the characteristic recognition unit 120 with the information. Referring to FIG. 3, the information acquisition unit 110 acquires information on the positions of a first object 305 positioned on a movement path 303 of a platform 301 and a second object 307 positioned in the vicinity of the movement path 303, information on a relative distance with the platform, and the like (S201).

Then, the characteristic recognition unit 120 analyzes and recognizes geometrical characteristics for objects existing in the vicinity of the platform through the information acquired by the information acquisition unit 110, and provides the hierarchization unit 150 with the recognized geometrical characteristics. Such a characteristic recognition unit 120 is able to acquire information on the surface, volume and the like of the objects based on the geometrical characteristics including lengths, breadths, and heights of the objects (S203).

The hierarchization unit 150 recognizes the visualization rules stored in the visualization rule storage unit 130 and the visualization effect information stored in the visualization effect storage unit 140 (S205).

The hierarchization unit 150 performs hierarchization for the objects by using the geometrical characteristics, the visualization rules, and the visualization effect information of the objects, and provides the visualization unit 160 with a result of the hierarchization. Such a hierarchization unit 150 classifies the information on the object into three layers including the geometric characteristics, the visualization rules, and the visualization effect information, and stores the three layers.

For example, when the visualization rule is "the expected collision situation", it is possible to store a visualization effect of "flickering in a red color" in a one-to-one manner, and when the visualization rule is "the expected approximate situation", it is possible to store a visualization effect of "an indication with an arrow" in a one-to-one manner (S207).

Then, the visualization unit 160 reproduces a visualization effect based on the visualization effect information corresponding to the specific situations according to a result obtained by performing the hierarchization by the hierarchization unit 150. Referring to FIG. 3, a movement path image 403 of the platform 301 is visualized, an image 405 of the first object 305 having the visualization rule of "the expected collision situation" is visualized with a red color flickering image 505 according to the corresponding visualization effect information, and an image 407 of the second object 307 having the visualization rule of "the expected approximate situation" is visualized with an arrow image 507 according to the corresponding visualization effect information (S209).

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method of environment visualization for a tele-operation, comprising:

acquiring information on a surrounding environment of a platform to be subject to a tele-operation;

analyzing and recognizing geometrical characteristics for objects existing in a vicinity of the platform through the acquired information;

recognizing visualization rules for a plurality of specific situations according to relative positional relations between the platform and the objects and visualization effect information to be reproduced in the specific situations according to the visualization rules;

performing hierarchization for the objects by using the geometric characteristics, the visualization rules, and the visualization effect information; and reproducing a visualization effect based on the visualization effect information corresponding to the specific situations according to a result of the performed hierarchization.

2. The method of claim 1, wherein, in the acquiring of the information, at least one of information on a shape of the object, information on a position of the object, and information on a relative distance between the platform and the object is acquired.

3. The method of claim 1, wherein, in the analyzing and recognizing of the geometrical characteristics, information on volume of the object is acquired based on the geometrical characteristics including a length, a breadth, and a height of the object.

4. The method of claim 1, wherein the visualization rules include visualization rules in at least one of an expected collision situation with the object, an expected going-over situation, and an expected approximate situation, which occur by movement of the platform.

5. The method of claim 1, wherein the visualization effect information corresponds to the plurality of specific situations in a one-to-one manner.

6. The method of claim 1, wherein the visualization effect information includes at least one of a color change effect, a flickering effect, and a lustrous effect.

7. An apparatus of environment visualization for a tele-operation, comprising:

an information acquisition unit for acquiring information on a surrounding environment of a platform to be subject to a tele-operation;

a characteristic recognition unit for analyzing and recognizing geometrical characteristics for objects existing in a vicinity of the platform through the information acquired by the information acquisition unit;

a visualization rule storage unit for storing visualization rules for a plurality of specific situations according to relative positional relations between the platform and the objects;

a visualization effect storage unit for storing visualization effect information to be reproduced in the specific situations according to the visualization rules;

a hierarchization unit for performing hierarchization for the objects by using the geometric characteristics, the visualization rules, and the visualization effect information; and a visualization unit for reproducing a visualization effect based on the visualization effect information corresponding to the specific situations according to a result of the hierarchization performed by the hierarchization unit.

8. The apparatus of claim 7, wherein the information acquisition unit acquires at least one of information on a shape of the object, information on a position of the object, and information on a relative distance between the platform and the object.

9. The apparatus of claim 8, wherein the visualization effect storage unit stores the visualization effect information corresponding to the plurality of specific situations in a one-to-one manner.

10. The apparatus of claim 8, wherein the visualization effect information includes at least one of a color change effect, a flickering effect, and a lustrous effect.

11. The apparatus of claim 7, wherein the characteristic recognition unit acquires information on volume of the object based on the geometrical characteristics including a length, a breadth, and a height of the object.

12. The apparatus of claim 7, wherein the visualization rule storage unit stores visualization rules in at least one of an expected collision situation with the object, an expected going-over situation, and an expected approximate situation, which occur by movement of the platform.

* * * * *